United States Patent
Volz et al.

[11] Patent Number: 6,082,830
[45] Date of Patent: *Jul. 4, 2000

[54] BRAKE SYSTEM HAVING VARIABLE PUMP PRESSURE CONTROL AND METHOD OF PRESSURE CONTROL

[76] Inventors: Peter Volz, In den Wingerten 14, 64291 Darmstadt; Dieter Dinkel, Adolf-Guckes-Weg 2, 65817 Eppstein/TS.; Hans-Dieter Reinartz, In der Romerstadt 169, 60439 Frankfurt am Main, all of Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,809
[22] PCT Filed: Sep. 29, 1995
[86] PCT No.: PCT/EP95/03849
 § 371 Date: Jun. 19, 1997
 § 102(e) Date: Jun. 19, 1997
[87] PCT Pub. No.: WO96/10507
 PCT Pub. Date: Apr. 11, 1996

[30] Foreign Application Priority Data

Sep. 30, 1994 [DE] Germany ............... 44 34 960

[51] Int. Cl.⁷ ..................................... B60T 8/48
[52] U.S. Cl. .................... 303/113.4; 303/113.2; 303/116.2; 303/122.12; 303/122.13; 303/140
[58] Field of Search .............. 303/143.2, 116.1, 303/116.2, 115.2, DIG. 4, 162, 161, 122.12, 122.13, 140

[56] References Cited

U.S. PATENT DOCUMENTS

| | | | |
|---|---|---|---|
| 4,462,642 | 7/1984 | Leiber | 303/113.4 |
| 4,687,260 | 8/1987 | Matsui et al. | 303/116.1 |
| 5,152,585 | 10/1992 | Patient et al. | 303/113.4 |
| 5,261,730 | 11/1993 | Steiner et al. | 303/113.4 |
| 5,295,737 | 3/1994 | Epple et al. | 303/116.1 |
| 5,312,169 | 5/1994 | Buschmann | 303/140 |
| 5,484,194 | 1/1996 | Reinartz et al. | 303/116.2 |
| 5,584,539 | 12/1996 | Hashida | 303/116.2 |

FOREIGN PATENT DOCUMENTS

| | | |
|---|---|---|
| 509237 | 10/1992 | European Pat. Off. . |
| 3731295 | 4/1988 | Germany . |
| 3831426 | 4/1989 | Germany . |
| 3906141 | 9/1989 | Germany . |
| 3819490 | 12/1989 | Germany . |
| 4002865 | 8/1991 | Germany . |
| 4004270 | 8/1991 | Germany . |
| 4101597 | 8/1991 | Germany . |
| 4032876 | 4/1992 | Germany . |
| 4037142 | 5/1992 | Germany . |
| 4108640 | 9/1992 | Germany . |
| 4119662 | 12/1992 | Germany . |
| 4121604 | 1/1993 | Germany . |
| 4128386 | 3/1993 | Germany . |
| 4201732 | 7/1993 | Germany ............ 303/113.2 |
| 4223602 | 1/1994 | Germany . |
| 4232311 | 2/1994 | Germany . |
| 4232132 | 3/1994 | Germany . |
| 4334941 | 4/1994 | Germany . |
| 4241595 | 6/1994 | Germany . |
| WO89/08573 | 9/1989 | WIPO . |
| WO93/22169 | 11/1993 | WIPO . |
| WO94/27848 | 12/1994 | WIPO . |
| WO96/10507 | 4/1996 | WIPO . |

Primary Examiner—Matthew C. Graham

[57] ABSTRACT

Electronic control of the supply pressure of the pump is suggested with respect to a hydraulic brake system which is used for brake slip control, traction slip control and further driving stability control operations. Means of action include, for example, the control or reduction of the motor current of the pump, electromagnetic closure of the suction valve of the pump or a brief change-over of the separating valve in the brake line.

6 Claims, 2 Drawing Sheets

BRAKE SYSTEM HAVING VARIABLE PUMP PRESSURE CONTROL AND METHOD OF PRESSURE CONTROL

BACKGROUND OF THE INVENTION

The present invention relates to a hydraulic brake system including a pedal-operated master cylinder connected to a supply reservoir, a wheel brake which is connected to the master cylinder by way of a brake line, a pump driven by an electric motor and connected to the brake line, and to a method of pressure control implemented in a brake system of this type.

A brake system of this type is disclosed in German patent application No. 41 28 386. The prior art brake system is used for brake slip control and traction slip control. During brake slip control operations, the brake system operates according to the return principle. For traction slip control operations, the pump of the brake system is of the self-priming type and adapted to take in pressure fluid from the supply reservoir by way of a second suction line and the master cylinder. A separating valve in the brake line is an electromagnetically operated valve which is normally open and functions as a pressure limiting valve in its energized condition. When the supply pressure of the pump exceeds a predetermined value, as compared to the master cylinder pressure, pressure fluid discharges through the separating valve to the master cylinder.

When a brake system of this type is also intended to be used for brake management operations, to the effect of not only eliminating brake slip and traction slip but also for ensuring general driving stability control, e.g. during cornering without braking, it is desirable that the supply pressure of the pump is not fixed to a constant differential value between the pressure line and the master cylinder, but is variable in conformity with requirements.

SUMMARY OF THE INVENTION

This objective is achieved by an electronically controlled adjustment of the supply.

Such adjustment operations can be performed by control of the motor current of the electric motor, by an adjustable differential pressure of the separating valve in its operating position, or by limiting the pressure fluid supply to the suction side of the pump.

For example, the master cylinder pressure and the instantaneous, actual supply pressure of the pump may be taken into account as measured variables for the evaluation.

Appropriately, the master cylinder pressure is sensed by pressure sensors which are arranged in the brake line between the master cylinder and the separating valve. The supply pressure of the pump can be determined, for example, by measuring the motor current and comparing it with memorized motor characteristic curves. The resultant volume flow may be converted to the present supply pressure of the pump by way of a pressure volume pattern which is memorized in the electronic control unit. The switching time of the outlet valve and the size of the low-pressure accumulator are taken into account in these considerations.

The idea of the present invention will be explained in detail hereinbelow, making reference to the description of three Figures in the drawings.

DETAILED DESCRIPTION OF THE DRAWINGS

Figure 1:
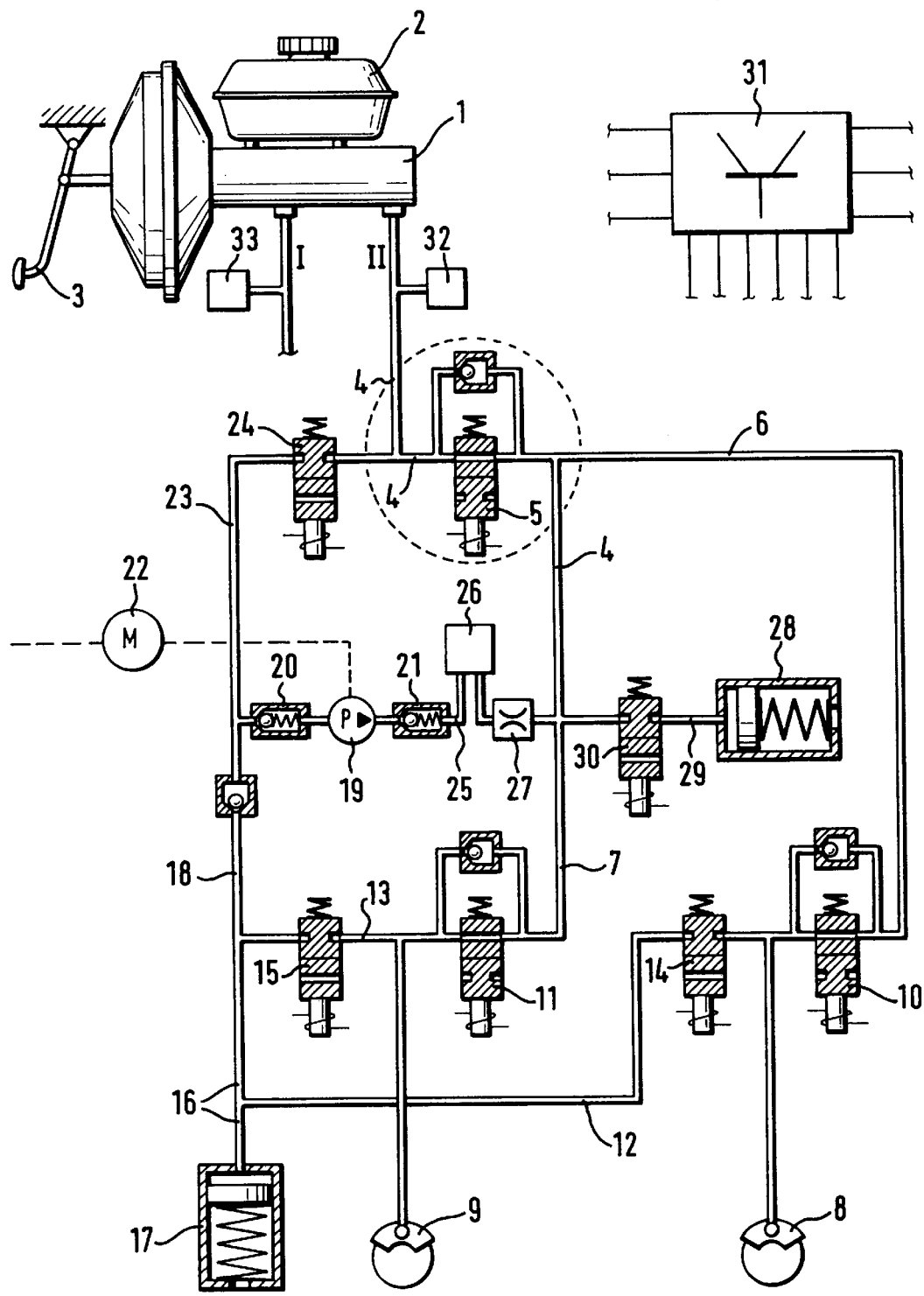
FIG. 1 shows a brake system of the present invention.

In the brake system of FIG. 1, two identically designed brake circuits I and II (of which only brake circuit II is shown) originate from a master cylinder 1. The master cylinder 1 is connected to a supply reservoir 2 and operated by brake pedal 3, with the result that braking pressure is built up in brake circuits I and II. A brake line 4 originates from the master cylinder 1 and extends through a separating valve 5. Brake branch lines 6 and 7 extend from the brake line 4 to one of wheel brakes 8 and 9, respectively. Inlet valves 10, 11 are inserted in the brake branch lines 6 and 7, respectively. Return branch lines 12 and 13 extend from the wheel brakes 8 and 9 to a return line 16 to which a low-pressure accumulator 17 is connected. Outlet valves 14 and 15 are arranged in the return branch lines 12 and 13. A first suction line 18 leads from the low-pressure accumulator 17 to the suction side of a pump 19 which includes a suction valve 20 and a pressure valve 21. Pump 19 is a self-priming pump driven by a motor 22. A second suction line 23 connects the suction side of the pump 19 to the brake line 4 between the master cylinder 1 and the separating valve 5. A change-over valve 24 is inserted into the second suction line 23. By way of a pressure line 25, the pressure side of the pump 19 is connected to the brake line 4 between the separating valve 5 and the inlet valves 10 and 11. A damping chamber 26 including a subsequent throttle 27 is provided in the pressure line 25. At the level of the connection of pressure line 25 to the brake line 4, further, a high-pressure accumulator 28 is connected to the brake line 4 by way of an accumulator line 29. A switch-over valve 30 is inserted into the accumulator line 29. The inlet valves 10 and 11 and the separating valve 5 are configured as electromagnetically operated, normally open two-way/two-position directional control valves. The outlet valves 14, 15, the change-over valves 24 and the switch-over valve 30 are electromagnetically operated, normally closed valves.

The operation of the illustrated brake system during brake slip control and traction slip control is disclosed in the state of the art. For driving stability control, no matter whether with or without the actuation brake pedal, the high-pressure accumulator 28 is connected to any one or both of the wheel brakes 8 and 9 by change-over of the switch-over valve 30. This ensures a quick pressure increase, even at low temperatures when the brake fluid is highly viscous. In these operations, the separating valve 5 is closed in order to prevent the pressure built up in the high-pressure accumulator 28 from propagating into the master cylinder 1 when the brake pedal 3 is not operated, and to thereby minimize reactions to the brake pedal 3 when the brake pedal 3 is operated. In contrast to the state of the art, the separating valve 5 (represented in dotted lines) has no pressure relief valve which opens from the pressure side of the pump 19 to the master cylinder 1. This is because control of the motor current of the electric motor 22 in conformity with requirements is provided for a variable adjustment of the supply pressure of the pump 19. To this end, the electronic control unit 31 evaluates data about the master cylinder pressure sent by pressure sensors 32 and 33 in the brake lines directly arranged at the master cylinder 1. The instantaneously prevailing supply pressure of the pump 19 is determined by measuring the instantaneous motor current, using a current measuring means 38, by comparing the value with motor characteristic curves memorized in the electronic control unit 31, and by converting the supply volume value produced by comparison to the supply pressure by way of a pressure-volume pattern which is also stored in the electronic control unit. The rates of pressure fluid flow through the outlet valves at determined switching times and the size of the low-pressure accumulator are taken into account in the conversion. Possible arrangements for the control of the supply pressure of the pump 19 include, in addition to the control of the motor current, a temporary change-over of the separating valve 5 and an electromagnetically actuated closure of the suction valve 20. There is no special illustration of the suction valve 20 for the sake of clarity.

Figure 2:
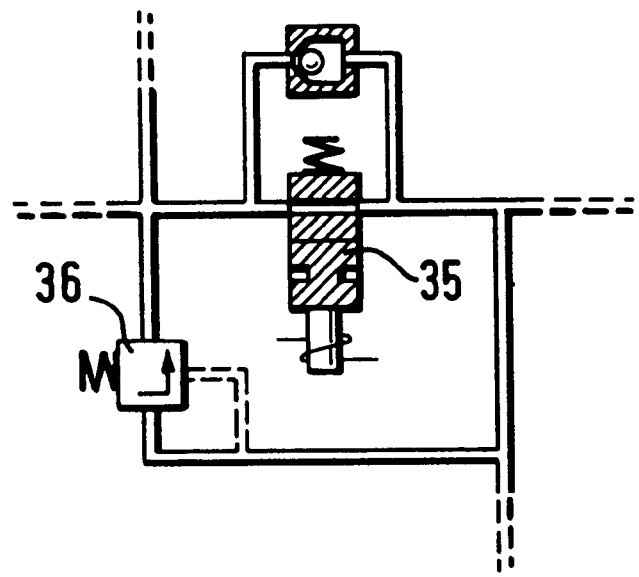
FIG. 2 and FIG. 3 each show a segment of the brake system of the present invention, which can be inserted in FIG. 1 instead of the segment shown in dotted lines.
Figure 3:
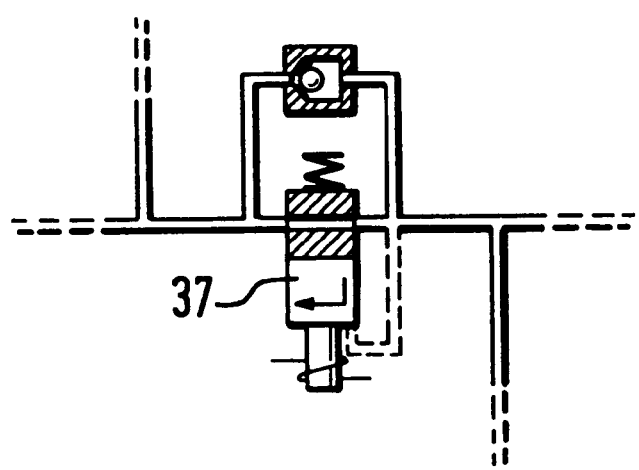

Instead of the separating valve 5 in FIG. 1, it is also possible to use a separating valve 35 having a parallel-connected pressure relief valve 36, as shown in FIG. 2 and known in the state of the art. The control action of the electronic control unit 31 occurs only if the master cylinder 1 is operated by the brake pedal 3 and the pressure sensors 32 and 33 sense a master cylinder pressure. The pressure is limited by the pressure relief valve 36 when the brake pedal 3 is not operated. However, it is also possible to adjust a defined maximum pressure by way of the pressure relief valve 36, and the supply pressure of the pump 19 can be limited to lower values by temporary change-over of the separating valve 35.

The separating valve 37 of FIG. 2 combines the functions of the separating valve 35 and the pressure relief valve 36 of FIG. 2. The deenergized basic position of the separating valve 37 permits a virtually unrestricted pressure fluid flow in both directions, and the energized switch position of the valve is adjustable to a differential pressure. The differential pressure between the pressure side of the pump 19 and the master cylinder, which has to be overcome, may be varied by way of a proportional magnet, for example. This obviates the need for a pulsed change-over of the separating valve. When the separating valve 37 is used, control of the motor current or electromagnetic closure of the suction valve 20 is, at most, appropriate if pressure from the master cylinder 1 is applied. However, it is also possible to adjust the differential pressure of the separating valve 37 to a correspondingly lower value when the brake pedal 3 is operated.

All of the above-mentioned control arrangements for limiting the supply pressure of the pump 19 are included in the present invention. They may be used individually or jointly.

We claim:

1. A hydraulic brake system including a pedal-operated master cylinder connected to a supply reservoir, a wheel brake which is connected to the master cylinder by way of a brake line and is connectable to a low-pressure accumulator by way of a return line, an inlet valve in the brake line and an outlet valve in the return line, a pump driven by an electric motor and connected to the low-pressure accumulator by way of a first suction line and to the brake line between the master cylinder and the inlet valve by way of a second suction line, the pump being connected to the brake line between the master cylinder and the connection of the second suction line by way of a pressure line, a separating valve in the brake line between the connections of the second suction line and the pressure line, a change-over valve in the second suction line and an electronic control unit, wherein the supply pressure of the pump during driving stability control is variably controllable by electronic actuation to adopt a desired variable value determined from driving stability control parameters being irrespective of brake pedal actuation during periods without brake slip control or traction slip control for increased driving stability control.

2. The brake system as claimed in claim 1, wherein the motor current of the pump is controllable based on comparing motor current data to master cylinder pressure data.

3. The brake system as claimed in claim 1, wherein the separating valve is variably adjustable to a differential pressure which is variable.

4. The brake system as claimed in claim 1, wherein the suction valve of the pump is adapted to be closed electrically.

5. The brake system as claimed in claim 1, wherein a pressure sensor is interposed in the brake line between the master cylinder and the separating valve.

6. The brake system as claimed in claim 1, wherein a means for measuring the motor current is provided.

* * * * *

UNITED STATES PATENT AND TRADEMARK OFFICE
CERTIFICATE OF CORRECTION

| | | |
|---|---|---|
| PATENT NO. | : 6,082,830 | Page 1 of 1 |
| DATED | : July 4, 2000 | |
| INVENTOR(S) | : Peter Volz, Dieter Dinkel and Hans-Dieter Reinartz | |

It is certified that error appears in the above-identified patent and that said Letters Patent is hereby corrected as shown below:

<u>Title page,</u>
Assignee, there is no assignee listed. The assignee should be listed as:

-- ITT Manufacturing Enterprises, Inc., Wilmington, DE --.

Signed and Sealed this

Fifth Day of November, 2002

*Attest:*

JAMES E. ROGAN
*Attesting Officer*  *Director of the United States Patent and Trademark Office*